(12) United States Patent
Stockmann

(10) Patent No.: US 7,299,897 B2
(45) Date of Patent: Nov. 27, 2007

(54) HYDRAULIC PLATFORM LIFT INCORPORATING POSITIVE DISPLACEMENT VALVE, AND POSITIVE DISPLACEMENT VALVE FOR HYDRAULIC PLATFORM LIFT

(75) Inventor: Thomas H. Stockmann, Ingersoll (CA)

(73) Assignee: Saf-Holland Equipment Limited, Norwich, Ontario (CA)

( * ) Notice: Subject to any disclaimer, the term of this patent is extended or adjusted under 35 U.S.C. 154(b) by 266 days.

(21) Appl. No.: 09/873,243

(22) Filed: Jun. 5, 2001

(65) Prior Publication Data
US 2002/0170785 A1    Nov. 21, 2002

(30) Foreign Application Priority Data
Apr. 27, 2001   (CA)   ................................ 2345850

(51) Int. Cl.
*B66B 9/04* (2006.01)
(52) U.S. Cl. .................. 187/274; 187/275; 91/515; 60/546; 60/562; 414/585
(58) Field of Classification Search ............ 187/274, 187/275, 347; 254/423, 89 H, 93 R; 60/562, 60/546; 91/515; 414/585; *F15B 7/00*
See application file for complete search history.

(56) References Cited

U.S. PATENT DOCUMENTS

| | | | |
|---|---|---|---|
| 2,882,685 A | 4/1959 | Carlsen et al. | |
| 3,347,043 A | 10/1967 | Freese | |
| 4,161,229 A * | 7/1979 | Mifsud ..................... | 181/114 |
| 4,337,959 A * | 7/1982 | Bettin et al. ............. | 280/43.23 |
| 4,463,563 A | 8/1984 | Krehbiel | |
| 4,655,031 A * | 4/1987 | Kucera ..................... | 56/11.9 |
| 5,012,898 A * | 5/1991 | Tsymberov ............... | 187/208 |
| 5,110,251 A | 5/1992 | Gray | |
| 5,513,943 A | 5/1996 | Lagash et al. | |
| 5,791,860 A | 8/1998 | Stockmann | |
| 6,189,432 B1 * | 2/2001 | Colarelli et al. .......... | 91/171 |

FOREIGN PATENT DOCUMENTS

CA         2007438        1/1990

OTHER PUBLICATIONS

Hydraulics, Theory and Applications, BOSCH Automation (3 pages).

* cited by examiner

*Primary Examiner*—Peter M. Cuomo
*Assistant Examiner*—Stefan Kruer
(74) *Attorney, Agent, or Firm*—Gowling Lafleur Henderson LLP; D. Doak Horne

(57) ABSTRACT

A hydraulic platform lift, having hydraulic pump means and first and second hydraulic cylinders each having a piston member therein, each operatively coupled to a respective side edge of a platform to permit raising and lowering of the platform. A positive displacement valve is further provided, with the hydraulic platform lift and comprises a pair of juxtaposed cylinder members, each containing a longitudinally-movable piston, such pistons operatively coupled to each other so that movement of one piston causes an equal movement of the other. The positive displacement valve is adapted, when the pump means provides pressurized hydraulic fluid via a respective aperture to a first side of each of the pistons, to cause the pistons to be displaced an equal distance causing an equal egress of hydraulic fluid from the cylinder members via a respective aperture.

25 Claims, 15 Drawing Sheets

HYDRAULIC PLATFORM LIFT INCORPORATING POSITIVE DISPLACEMENT VALVE, AND POSITIVE DISPLACEMENT VALVE FOR HYDRAULIC PLATFORM LIFT

FIELD OF INVENTION

The present invention relates to a hydraulic platform lift for use with a truck or truck trailer, and to a positive displacement valve for use in a hydraulic circuit for a hydraulic platform lift.

BACKGROUND OF THE INVENTION

Existing hydraulic platform lifts for trucks typically consist of a pair of vertically-aligned hydraulic cylinders attached at their respective lower ends to a platform. Each hydraulic cylinder comprises a piston member, which is attached (usually via a shaft or piston rod member) to one end of the platform which is to be raised and lowered. It is intended in most cases (with perhaps the exception of U.S. Pat. No. 5,791,860 to a self-leveling platform) that the hydraulic cylinders move in unison, so as to evenly raise and lower the platform. In certain cases, hydraulic lifts having hydraulic circuits of a specific configuration frequently experience unintended non-uniform movement of piston members within the hydraulic cylinders relative to each other due to uneven forces on each of the two cylinders due to uneven distribution of load on the platform. This results in tilting of the platform when being raised or lowered thereby constituting a safety hazard should the load on the platform be caused to shift and/or fall from the platform.

The problem of non-even movement of piston members within the hydraulic cylinders has been significantly reduced in the prior art by certain configurations for the hydraulic circuitry for such platform lifts. By way of example, U.S. Pat. No. 5,110,251, while it discloses a further embodiment of providing a particular relationship between the cross-sectional size of the first cylinder at the rod end to the cross-sectional area of the second cylinder at the cap end, incidentally discloses a particular hydraulic circuit for a hydraulic circuit for a truck liftgate, whereby as is illustrated in FIG. 2 (designated "Prior Art"), in order to raise the platform 21 hydraulic fluid is supplied from a hydraulic pump 11 to a first "double-acting" hydraulic cylinder 25 at the rod end 40 thereof. Upon the piston member 22 thereof being forced upward as a result, an equal amount of hydraulic fluid is forced from the cap end 41 thereof to the rod end 40 of the second cylinder 27, thereby causing the piston member 22 therein to rise an equal amount in the second cylinder 27. Advantageously, because the volume of hydraulic fluid forced into the first cylinder 25 at the rod end 40 is equal to the volume of hydraulic fluid thereby forced out from the cap end 41 of the first cylinder 25 and into the rod end 40 of the second cylinder 27, the movement of the piston members 22,23 in each of the cylinders 25,27 is caused to be substantially identical, regardless of the different forces which may be applied to the respective cylinders 25,27 due to a variation or "off-centering" of a load "L" which may be placed on the platform. The hydraulic circuit of U.S. Pat. No. 5,110,251, by teaching a solenoid-operated flow reverser valve 28 as shown in FIG. 2 ("Prior Art") attached hereto, is able to provide the platform 21 with not only "power up" but also "power down" capability, with in each case the benefit of substantially uniform displacement of the piston members 22 within the respective hydraulic cylinders 25,27. As is more particularly described in detail below, the hydraulic lift and hydraulic circuit of the present invention is able to achieve the benefits and advantages of the hydraulic lift disclosed in U.S. Pat. No. 5,110,251, but in a substantially different manner and in a way which produces at least one clear advantage over U.S. Pat. No. 5,110,251.

U.S. Pat. No. 5,791,860, also to the same inventor as the invention herein, teaches a hydraulic platform lift for a truck or truck trailer, and is directed towards a hydraulic platform having hydraulic and electrical circuitry to provide automated, or automated with manual override, platform leveling capability in the event the truck is tilted. U.S. Pat. No. 5,791,860 discloses three embodiments where leveling may be accomplished in three separate ways; a first embodiment where leveling is accomplished by stopping movement of one hydraulic cylinder and allowing the other hydraulic cylinder to "catch up", a second embodiment where leveling is accomplished by reversing the direction of movement of one hydraulic cylinder relative to the other to allow rapid leveling, and a third embodiment where the rate of movement of one piston member in a hydraulic cylinder is slowed relative to the piston member of the second hydraulic cylinder, to allow the piston member in such second hydraulic cylinder to "catch up". Incidentally, however, U.S. Pat. No. 5,791,860 teaches in inter alia FIGS. 3B, 4B, 5B, 6B and as more simplistically set out in FIG. 3 ("Prior Art") hereto, a hydraulic lift platform 21 for a truck wherein each hydraulic cylinder 25,27 is supplied with hydraulic fluid from a separate pump 11. A belt, gear, or shaft member 30 is provided connecting the two identical pumps 11, in order that the pumps 11 run at precisely the same speed and accordingly each provide precisely the same volume of hydraulic fluid to each of the respective first and second hydraulic cylinders 25,27. Accordingly, each of the piston members 22 within each of corresponding hydraulic cylinders 25,27, due to being provided with identical volumes of hydraulic fluid per given time unit, thereby move at equal rates and in unison regardless of any unequal forces which may be applied due to uneven load distribution on the platform 21. In order to provide "power up" and "power down" capability, solenoid-activated flow reverser valves 90 are provided in each hydraulic circuit for each hydraulic cylinder 25,27. Accordingly, like the hydraulic configuration of U.S. Pat. No. 5,110,251, the hydraulic lift circuit of FIG. 3 ("Prior Art") provides for uniform movement of piston members 22 regardless of unequal forces which may be applied due to uneven load distribution on the platform 21. Again, however, as is more particularly described in detail below, the hydraulic lift and hydraulic circuit of the present invention is able to achieve the benefits and advantages of the hydraulic lift disclosed in U.S. Pat. No. 5,791,860 but in a substantially different manner and in a way which produces at least one clear advantage over U.S. Pat. No. 5,791,860.

SUMMARY OF INVENTION

In one of its broad embodiments the present invention comprises a hydraulic platform lift for a truck or truck trailer for raising and lowering a platform, having a pair of hydraulic cylinders and a positive displacement valve means coupled to each of the hydraulic cylinders in a particular manner which serves to assist in equal synchronized movement of piston members within the hydraulic cylinders regardless of the difference in forces which may be applied to the individual cylinders due to uneven distribution of load on a platform.

Accordingly, in one of its broad aspects the present invention comprises a hydraulic platform lift for use with a truck or truck trailer, comprising:

a platform member having two opposite side edges;

first and second hydraulic cylinders each having a piston member therein, each of said first and second hydraulic cylinders operatively coupled to a respective side edge of said platform member to permit raising and lowering of said platform member;

pump means for supplying pressurized hydraulic fluid to said hydraulic cylinders via a positive displacement means; and said positive displacement means comprising a pair of longitudinally-moveable, spaced-apart pistons, each operatively coupled to each other so that movement of one piston causes an equal movement of the other, said pistons situate within a corresponding cylinder member, each cylinder member having a pair of opposite ends, one end of which having an aperture to permit ingress of hydraulic fluid from said pump means, and another aperture at an opposite end to permit egress of hydraulic fluid from said cylinder member to one of said hydraulic cylinders.

The positive displacement means, typically a positive displacement valve, is adapted, when the pump means provides pressurized hydraulic fluid via a respective aperture to a first side of each of said pistons, to cause the pistons to be displaced an equal distance causing an equal egress of hydraulic fluid from said cylinder members via a respective aperture from a side of each of said pistons opposite said first side and a corresponding equal supply of hydraulic fluid to each of said first and second hydraulic cylinders with resultant equal movement of said piston members therein regardless of different loads which may be applied to said first and second hydraulic cylinders.

Advantageously, the hydraulic platform lift of the present invention having a hydraulic circuit incorporating a positive displacement means as described above, is able to accomplish the synchronized movement of the piston members as was accomplished by each of the two prior art configurations described above, but in a completely different manner. The hydraulic circuit of the present invention provides an advantage over the circuit shown in FIG. 3 ("Prior Art") in that it requires only one pump, not two as required in the circuit disclosed in FIG. 3 ("Prior Art"), thereby resulting in an immediate cost savings of the hydraulic circuit of the present invention over the configuration shown in FIG. 3 ("Prior Art"). Moreover, due to inherent tolerances in the manufacture of pumps, pumps are never completely identical, and even though two pumps may be fixedly coupled together so as to run at the same speed, particularly at low speeds and low volume flows, pump output may vary somewhat from one pump to another, thereby causing non-synchronized movement of piston members within the respective cylinders. The hydraulic circuit for the platform lift of the present invention utilizes only one pump and accordingly is thereby able to completely eliminate this problem of uneven output from individual pumps.

The hydraulic lift of the present invention, as will be more fully described below, is particularly adapted for providing both "power up" and "power down"capability. In particular, in a further embodiment, the aperture for each cylinder member of the positive displacement valve (which permits the ingress of hydraulic fluid from the pump means for raising of the platform) permits egress of fluid from the cylinder member when said platform is desired to be lowered.

In a preferred embodiment of the positive displacement valve of the present invention and when used in the hydraulic platform lift of the present invention, the pistons therein are operatively coupled to each other by shaft means, and such shaft means extends perpendicularly from each of such pistons from opposite sides thereof, and in a further preferred embodiment the shaft means is centrally located in each of the cylinder members making up the positive displacement valve.

In yet a further embodiment of the positive displacement valve, the shaft means of the positive displacement valve extends perpendicularly outwardly from opposite sides of one piston and from only one side of the other of the pair of pistons. This configuration provides for a very important advantage over the hydraulic circuit configuration shown in FIG. 2 ("Prior Art"). In particular, by eliminating shaft means extending from one side of one of the pistons, where the aperture on the cylinder member for permitting ingress of hydraulic fluid from the pump means is situate within the cylinder member proximate the side of the second piston having no shaft means extending therefrom, such configuration provides for a "force multiplier" or mechanical advantage. Specifically, due to the absence of a shaft member extending from one side of the piston, the area on the piston on which the high-pressure hydraulic fluid supplied by the pump means will be able to push will be accordingly greater in area (due to the absence of the shaft means) than the other side of the piston member which has the shaft means. Accordingly, since Force=(pressure)×(area), the force exerted by the piston on the side not having the shaft will be greater that the resisting force on the opposite side of the piston resisting by a certain amount due to the lesser area (due to the area "taken up" by the shaft means). By way of specific quantitative example of the multiplication factor that is able to be achieved, in a situation of a positive displacement valve comprised of circular cylinder members, assuming an inner diameter of 4 inches and a shaft diameter of 2 inches which extends from only one side of the piston, the ratio in surface area of one side of the circular piston compared to the other would be:

$$\frac{\Pi(4)^2}{\Pi(4)^2 - \Pi(2)^2} \text{ (ie. a ratio of 1.33:1)}$$

or stated otherwise, a resultant 33% increase in the force applied by the positive displacement valve is theoretically obtainable on the hydraulic fluid contained therein (a 16.5% increase in the force to each of two cylinders) than would otherwise be the case if the fluid was simply supplied by the pump means directly to the hydraulic cylinders, or if the shaft extended from both sides of the piston. Accordingly, for the same amount of necessary pressure, a lower pressure pump can be used resulting in a definite cost savings over what would otherwise be a higher pressure pump that would be required to produce a pressure necessary to lift a given load. Thus by being able to size a smaller pump for a hydraulic cylinders of given lifting capability, the hydraulic circuit of the present invention possesses a definite advantage over prior art hydraulic lifts having the hydraulic circuit shown in FIG. 2 ("Prior Art").

Separate and apart from the problem of non-even movement of piston members within cylinders due to non-equal distribution of load on the platform is the problem of non-even movement of piston members which arises due to uneven wear or variation in performance of one hydraulic cylinder as opposed to the other. For example, a hydraulic cylinder that is new, when supplied with pressurized hydraulic fluid, will generally cause the corresponding piston member therein to move more than would a hydraulic cylinder whose piston seals leak. Accordingly, where one hydraulic cylinder is in perfect operating condition and the other has some other performance-limiting feature, such as worn seals, such situation results in the two hydraulic cylinders (in particular the piston members therein) becoming unsynchronised. Specifically, the aforementioned situation typically results in the two piston members becoming "out of phase" with each other, which results in non-level raising or lowering of the platform member with resulting serious safety issues as previously described.

As a means of being able to re-align or "re-synchronize" the piston members within the hydraulic cylinders, the present invention provides, in a preferred embodiment, that the cylinder members of the positive displacement means each possess piston phasing means proximate at least one end thereof to permit resynchronization (ie. realigned positioning) of the piston members within the first and second hydraulic cylinders relative to each other, in order to overcome the problem of the piston members becoming out of alignment due to differences in operation between the two hydraulic cylinders. More particularly in a preferred embodiment, the piston phasing means in each cylinder member comprises a pair of apertures proximate one end of each cylinder member, spaced apart from each other along a longitudinal axis of the cylinder member. Although both apertures are situate close to one end of a corresponding cylinder member, the aperture most proximate the end of the cylinder member is preferably larger in area and permits more flow of hydraulic fluid there through than the other aperture. The longitudinal spacing of the apertures is such that the piston when it moves to the end of the corresponding cylinder member will move to a position intermediate the longitudinal spacing of the two apertures, thereby allowing hydraulic fluid to escape from both apertures when the piston is at its extremity of travel at one end of the cylinder member. Accordingly, in operation, the piston phasing means of each cylinder member, when the pistons of each cylinder member move to a respective end (ie maximum extremity) of the corresponding cylinder member, permits hydraulic fluid to continue to be supplied to the hydraulic cylinders. In the event that one of the hydraulic cylinder members has reached the end of its travel (ie when one side of the platform has thereby been moved to the maximum raised or lowered position), with such piston phasing means pressurized hydraulic fluid will continue to flow to such hydraulic cylinder, to permit it to "catch up" and permit it too to reach the maximum extent of its travel, thereby "resynchronizing" the piston members in such hydraulic cylinders and thereby re-leveling the attached platform.

Where piston phasing means (in the preferred embodiment a pair of apertures) are provided at only one end of each cylinder member of the positive displacement valve, the hydraulic cylinders can only be "re-phased" at only one extremity of their travel, namely at the uppermost extremity of their travel (ie when the corresponding side of the platform is in the maximum raised position), or at the lowermost extremity of travel (ie when the corresponding side of the platform is in the maximum lowered position). It is generally preferable to permit re-phasing of piston members in hydraulic cylinders at either the maximum raised position or maximum lowered position of the hydraulic cylinders, so that the platform is level at the time of commencing either its downward motion from its uppermost raised position, or at the time of commencing its upward motion from its most lowered position. Accordingly, in a preferred embodiment, each cylinder member of the positive displacement valve possesses a pair of piston phasing means, namely a pair of apertures, at each of the opposite ends of each cylinder member.

Because the platform is intended to be lowered, possibly with load, in a "power-down"condition, it is preferable in order to avoid the platform dropping precipitously due to the action of both hydraulic fluid being supplied and also the load acting on the platform and thus on the two hydraulic cylinders, that flow restriction means be incorporated in the hydraulic circuit to prevent uncontrolled descent of the platform. Accordingly, in a preferred embodiment, such flow restriction means is a solenoid-actuated valve means which is capable of at least restricting the continuous flow of hydraulic fluid to thereby prevent uncontrolled descent of the platform. In a preferred embodiment such valve means is a counterbalance valve as is commonly used in the art, but other valve arrangements may be used.

In yet another embodiment of the invention, the hydraulic cylinders themselves may possess piston member phasing means (which in the preferred embodiment are a pair of apertures longitudinally spaced apart along the longitudinal axis of the hydraulic cylinder) at only one end of both hydraulic cylinders or at both ends of each hydraulic cylinder. This feature may be used with or without piston phasing means being incorporated on the positive displacement valve. In particular, piston member phasing in the hydraulic cylinders, when used with piston phasing on the positive displacement valve, is advantageous in situations where one of the piston members contained in the hydraulic cylinders reaches the top (or bottom) of its stroke prior to the other piston member, and prior to either piston in the positive displacement valve reaching the extremity of travel. In such condition, by having piston phasing of the piston members in the hydraulic cylinders, hydraulic fluid can continue to be supplied to both hydraulic cylinders, with hydraulic fluid being permitted to escape from one of the apertures of the hydraulic cylinder which has already reached the extremity of travel, thereby permitting both pistons within the respective cylinder members to continue movement.

Accordingly, in a preferred embodiment, the first and second hydraulic cylinders each have mutually opposite opposed ends, and such first and second cylinders each possess piston phasing means proximate a same end thereof. More particularly, in a further refinement thereof, the first and second cylinders may be provided with a longitudinal axis, wherein the piston phasing means comprises a pair of apertures, of different area and spaced apart from each other on said longitudinal axis, with said aperture of said pair of apertures most proximate said same end thereof being larger in area than said other of said apertures, and at the extent of full travel of the piston member therein hydraulic fluid is permitted to escape from the aperture of smaller area. Alternatively, as mentioned above, where each hydraulic cylinder possesses mutually opposite ends, the first and second hydraulic cylinders each possess piston phasing means proximate each of said opposite ends thereof.

BRIEF DESCRIPTION OF THE DRAWINGS

Further objects and advantages of the invention will be apparent from the following drawings of preferred and non-limiting embodiments of the invention, in which.

DETAILED DESCRIPTION OF PREFERRED EMBODIMENTS

Figure 1:
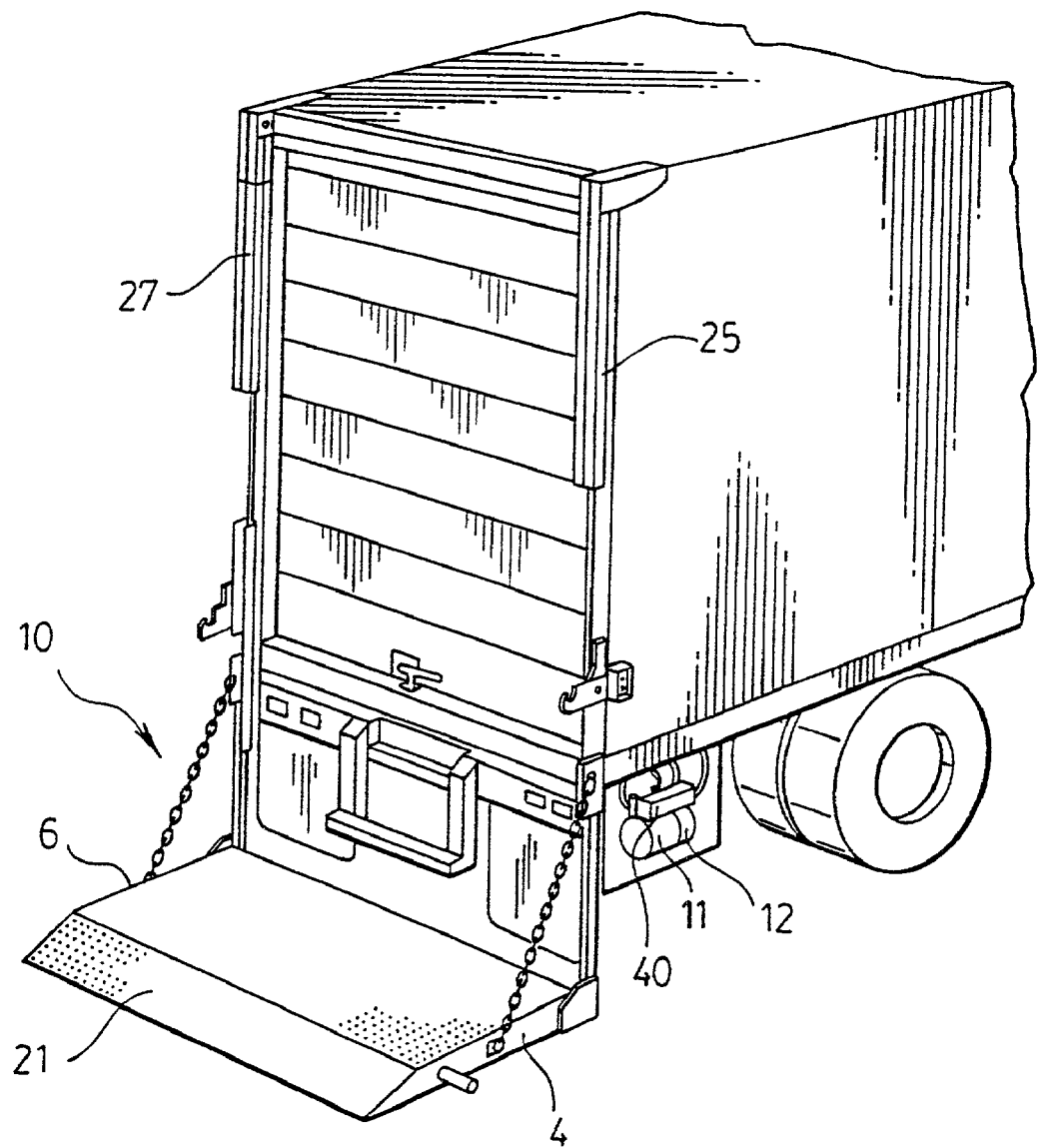
FIG. 1 is a perspective view of the rear of a truck having installed thereon a hydraulic platform lift of the present invention.
Figure 2:
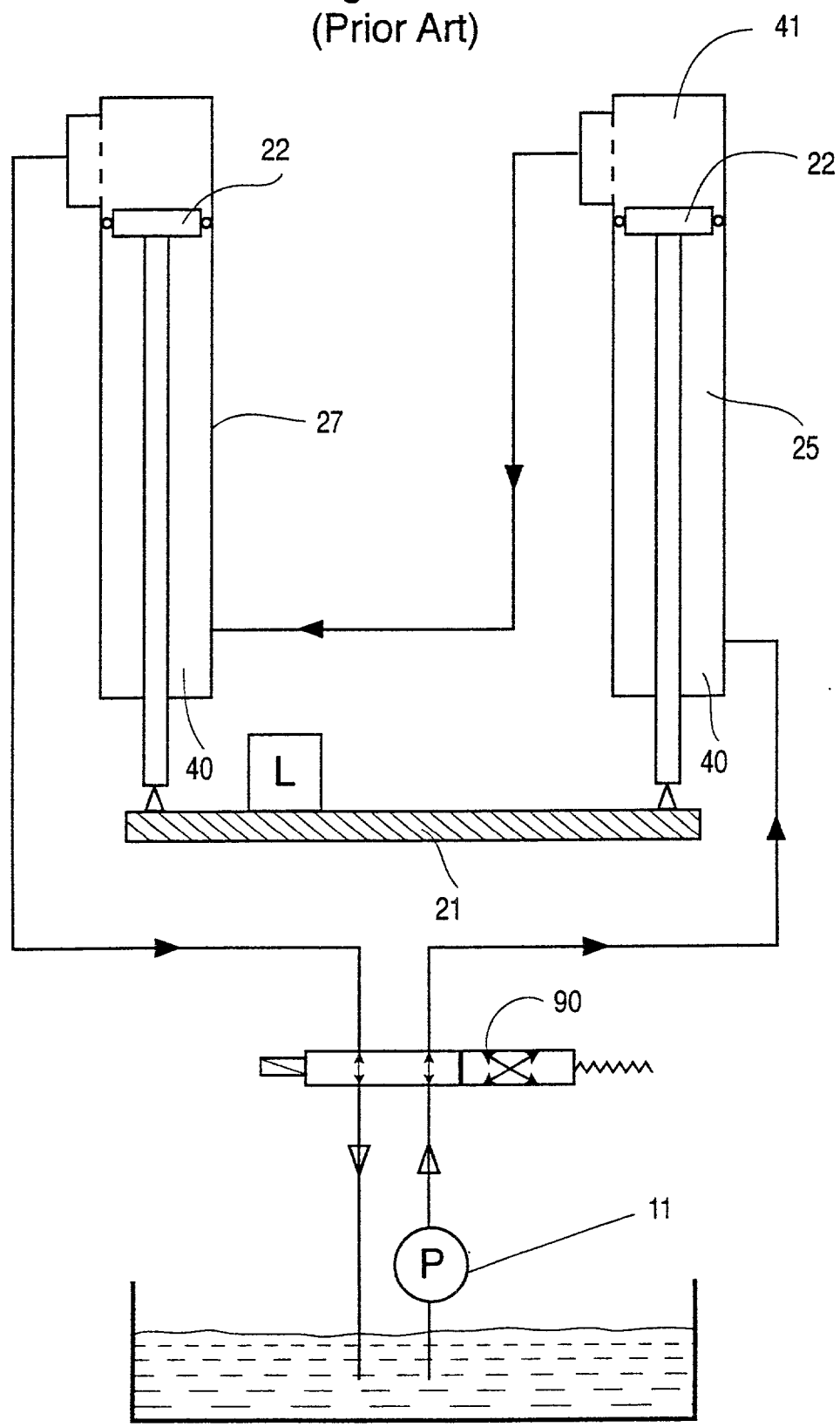
FIG. 2 is a schematic view of a hydraulic circuit for the prior art hydraulic platform lift disclosed in U.S. Pat. No. 5,110,251 to Gray.

FIG. 1 shows a hydraulic platform lift 10 for use with a track or truck trailer 2. A platform 21 is provided, having two opposite side edges 4,6. First and second hydraulic cylinders 25,27 are provided, each having a piston member 22 (see FIGS. 4A, 4B, 5A, 5B, and 7 & 9) therein, which are coupled to the respective side edges 4,6 of platform 21 to permit vertical raising and lowering of platform 21. Pump means, in the form of a pump 11 and motor 12 is provided for supplying pressurized hydraulic fluid to the hydraulic cylinders 25,27 via a positive displacement means in the form of a positive displacement valve 40 (see FIGS. 4A, 4B, 5A, 5B, and 7 & 9).

Figure 6:
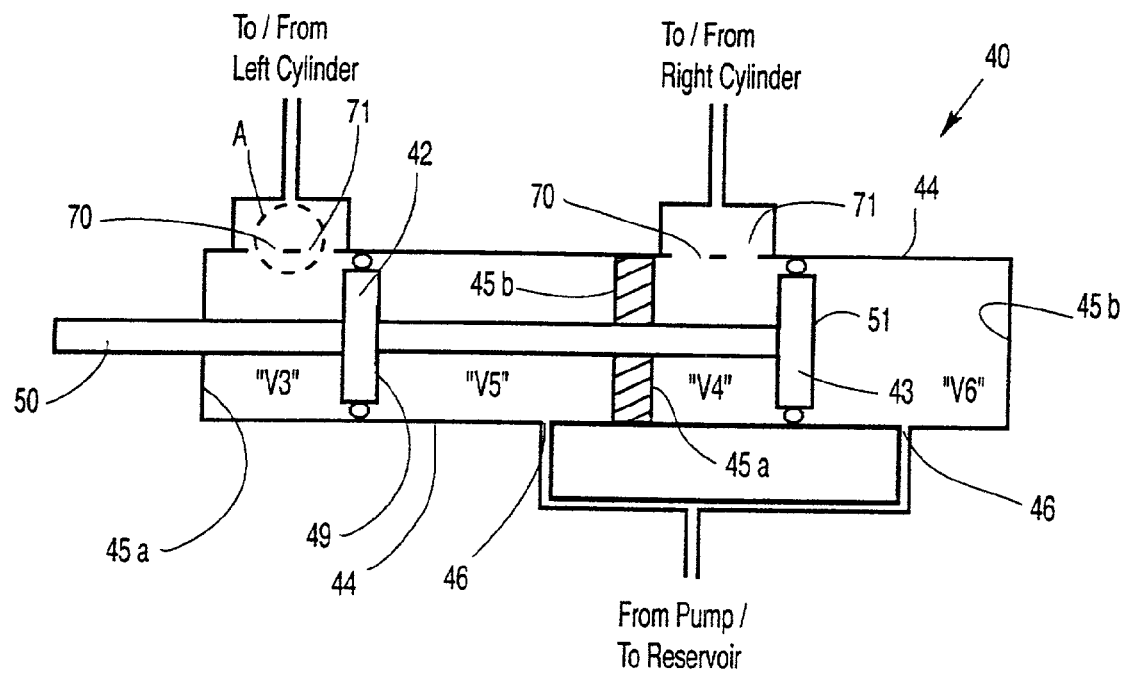
FIG. 6A is an enlarged schematic view of the embodiment of the positive displacement valve of the present invention shown in FIGS. 5A & B, showing the feature of absence of a shaft means from one side of one of the pistons in the positive displacement valve.
FIG. 6B is a view of area "A" of FIG. 6B.
Figure 6:
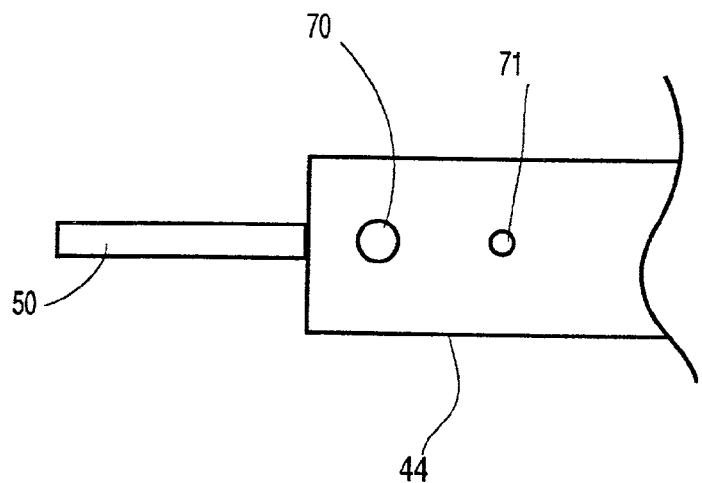
Figure 7:
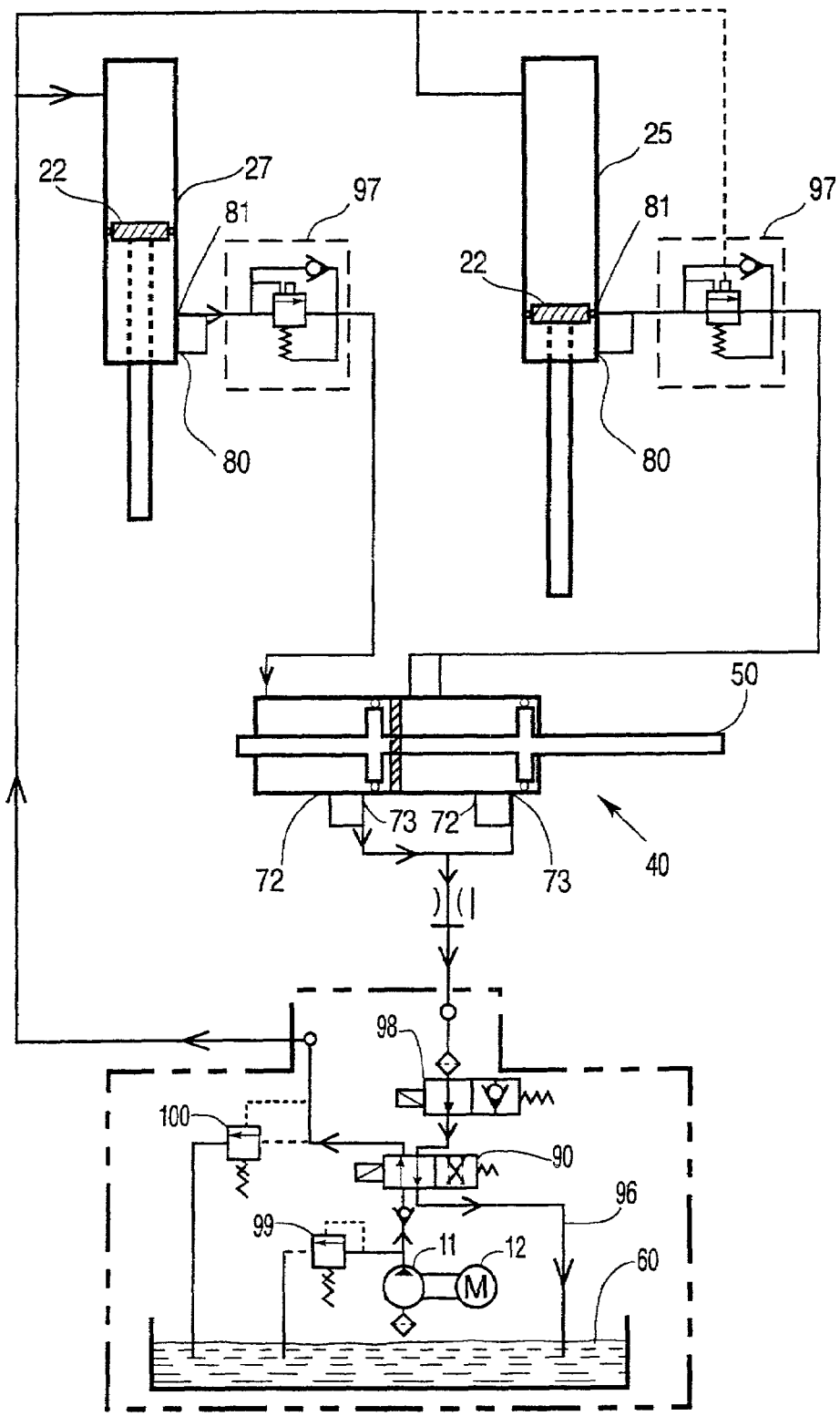
FIG. 7 is a view similar to FIGS. 4A and 5A above, but for the embodiment of the invention wherein piston phasing means are provided on one end of the cylinder members of the positive displacement valve, for permitting re-phasing of piston members within the hydraulic cylinders when at the lowermost position of their travel (ie when the platform is at its most lowered position) showing re-phasing of the left hydraulic cylinder where the piston member in the left hydraulic cylinder is being permitted by the piston phasing means on the positive displacement valve to "catch up" to the piston member in the right hydraulic cylinder which has already reached the maximum extent of its travel.
Figure 8:
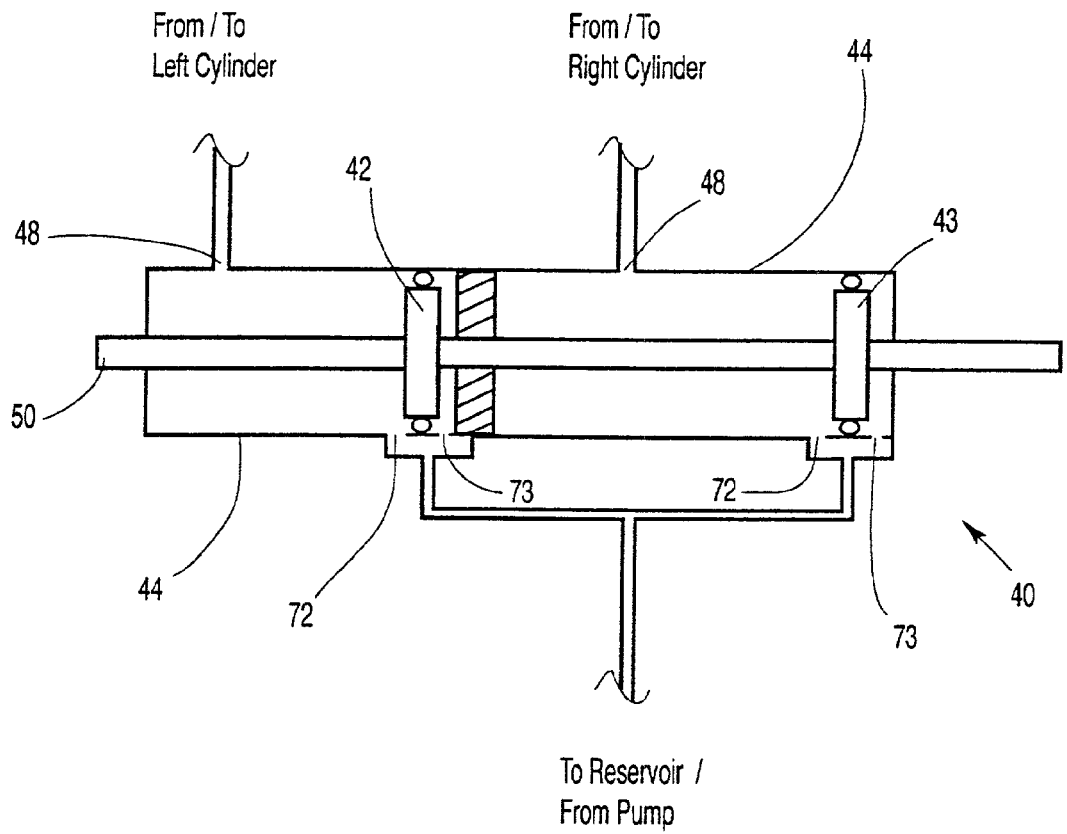
FIG. 8 is an enlarged schematic view of the embodiment of the positive displacement valve of the present invention shown in FIG. 7.

As may be most clearly seen from FIGS. 6 & 8, the positive displacement valve 40 of the present invention comprises a pair of longitudinally moveable, spaced-apart pistons 42,43 each operatively coupled to each other so that movement of one piston causes an equal movement of the other. Each of pistons 42,43 are situate within a corresponding cylinder member 44, each cylinder member having a pair of opposite ends 45a, 45b. Each cylinder member 44 further possesses an aperture 46 to permit ingress of hydraulic fluid from the pump 11 when the platform 21 is being raised, and another aperture 48 at an opposite end to permit egress of hydraulic fluid from the respective cylinder member 44 to a respective hydraulic cylinder 25,27 when the platform is desired to be raised so as to cause such hydraulic cylinders 25,27 to raise the platform 21.

Figure 4:
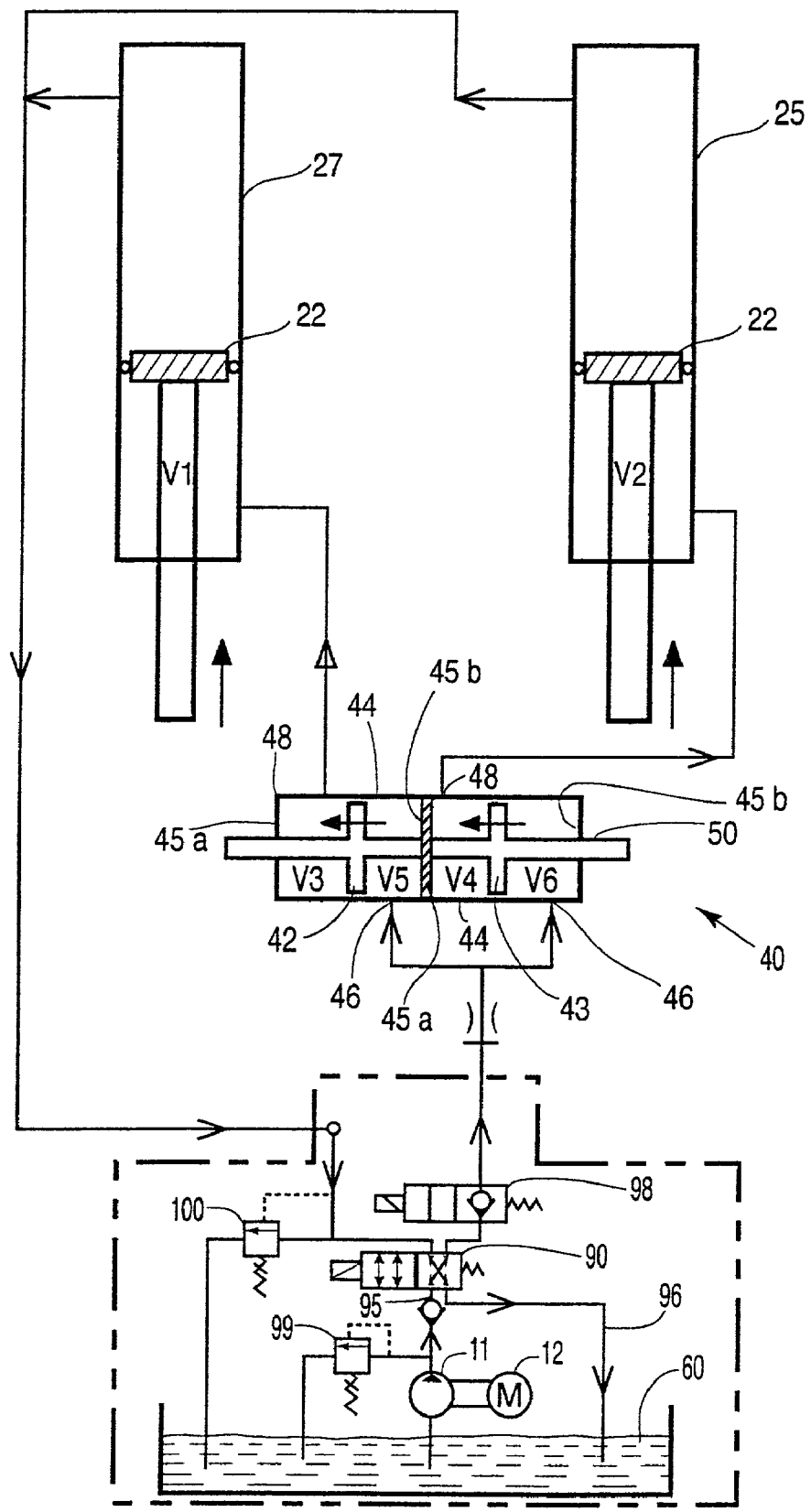
FIG. 4A is a schematic view of one embodiment of the hydraulic circuit for the hydraulic platform lift of the present invention, showing the position of pistons, piston members, and valves during the raising of the platform.
FIG. 4B is a view of the embodiment of the hydraulic circuit shown in FIG. 4A, but instead showing the position of pistons, piston members, and valves during the lowering of the platform.
Figure 4:
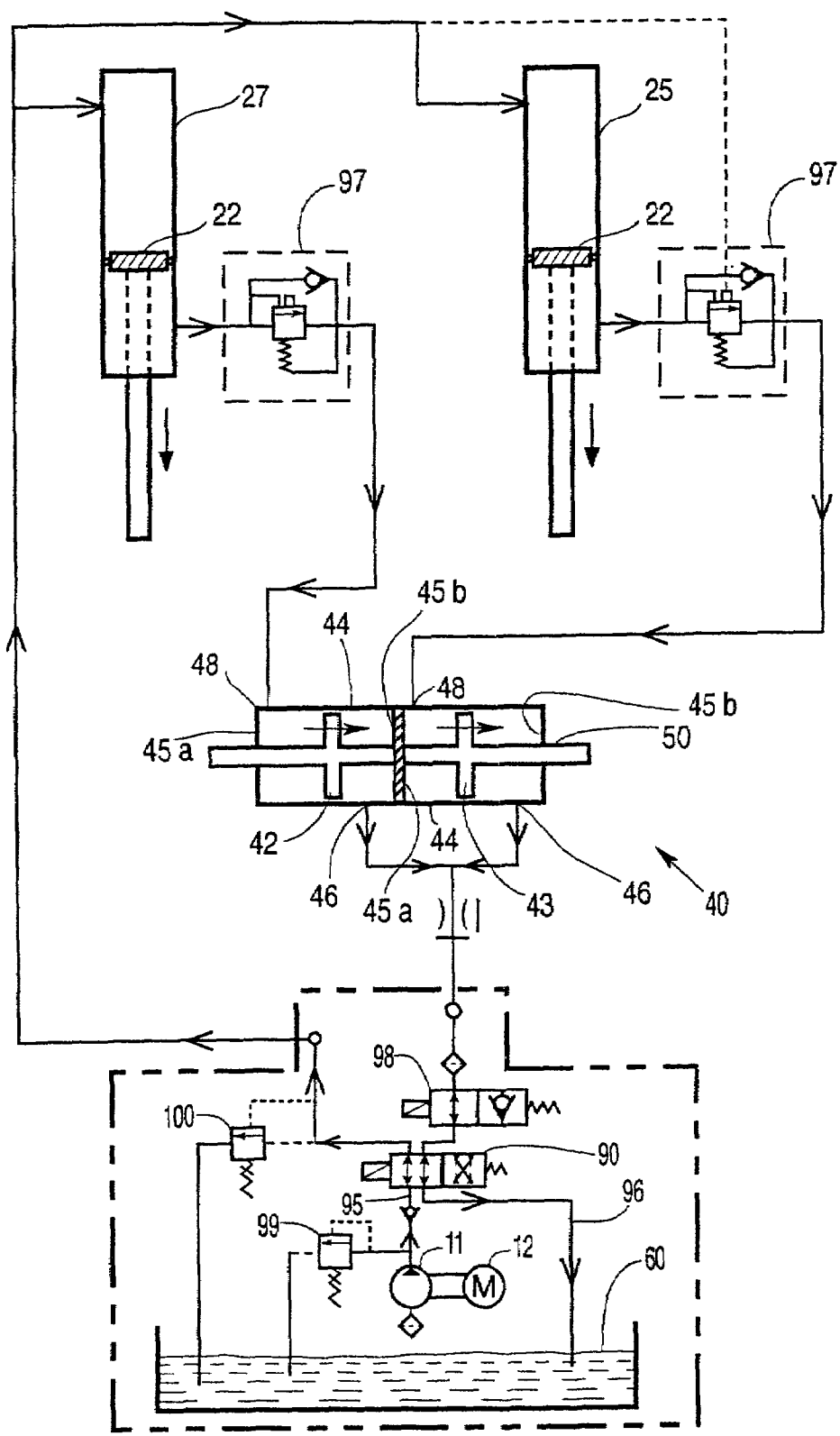

As may be seen from comparing each of hydraulic circuits shown in FIG. 4A with respective circuit shown in FIG. 4B, the apertures 46 in each cylinder member 44 which permit ingress of hydraulic fluid from pump 11 into cylinder members 44 when the platform 21 is being raised (ref. FIG. 4A) permit egress of fluid from the respective cylinder members 44 to a reservoir 60 when the platform 21 is desired to be lowered (Ref. FIG. 4B). Likewise, apertures 48 which permit egress of hydraulic fluid from each of cylinder members 44 to the hydraulic cylinders 25,27 when the platform is desired to be raised, permit ingress of hydraulic fluid from the hydraulic cylinders 25,27 back into cylinder members 44 when platform 21 is desired to be lowered.

Figure 3:
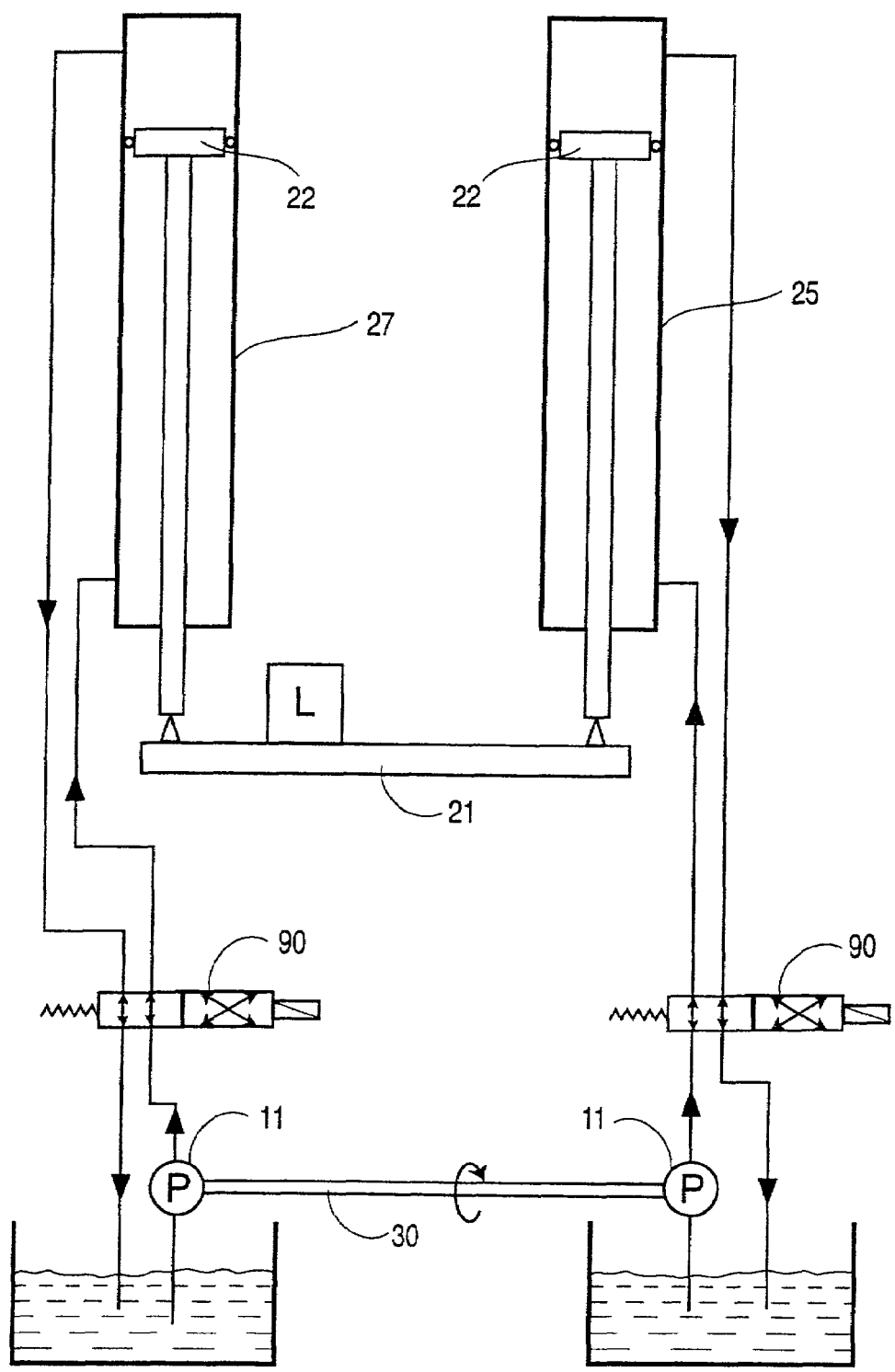
FIG. 3 is a schematic view of a hydraulic circuit for an alternate prior art hydraulic platform lift disclosed in U.S. Pat. No. 5,971,860 also to the within inventor.

As may be most clearly seen from FIG. 6, the positive displacement valve 40 is adapted, when the pump 11 provides pressurized hydraulic fluid via a respective aperture 46 to a first side 49, 51 of pistons 42, 43 respectively (ie namely to the side of the pistons 42,43 forming volumes "V5" and "V6" as shown in FIG. 4A) to cause the pistons 42,43 to be displaced an equal distance causing an equal egress of hydraulic fluid from the cylinder members 44 (ie from volumes "V3" and "V4" respectively as shown in FIG. 4A) and a corresponding equal supply of hydraulic fluid to each of the first and second hydraulic cylinders 25,27, with resultant equal movement of the piston members 22 therein regardless of different forces which may be applied to the first and second hydraulic cylinders 25,27 due to non-centering of load "L" on the platform 21, as shown for example in FIG. 3.

Figure 10:
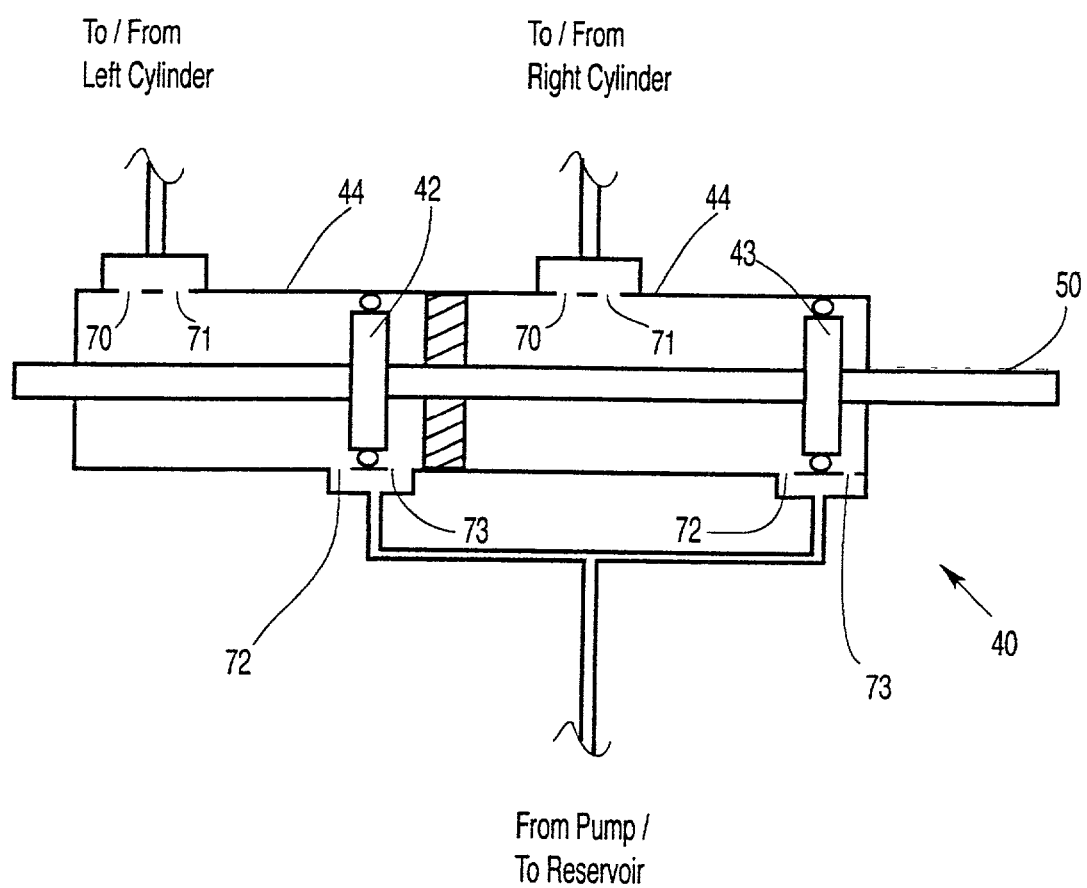
FIG. 10 is an enlarged schematic view of the embodiment of the positive displacement valve of the present invention shown in FIG. 9.

As may be seen from the preferred embodiments of the positive displacement valve 40 most clearly shown in FIGS. 6,8, & 10, the pistons 42,43 are preferably operatively coupled together by a shaft 50, such shaft extending perpendicularly from each of the pistons 42, 43 from opposite sides thereof. The shaft 50 is preferably located centrally within each of cylinder members 44.

Figure 5:
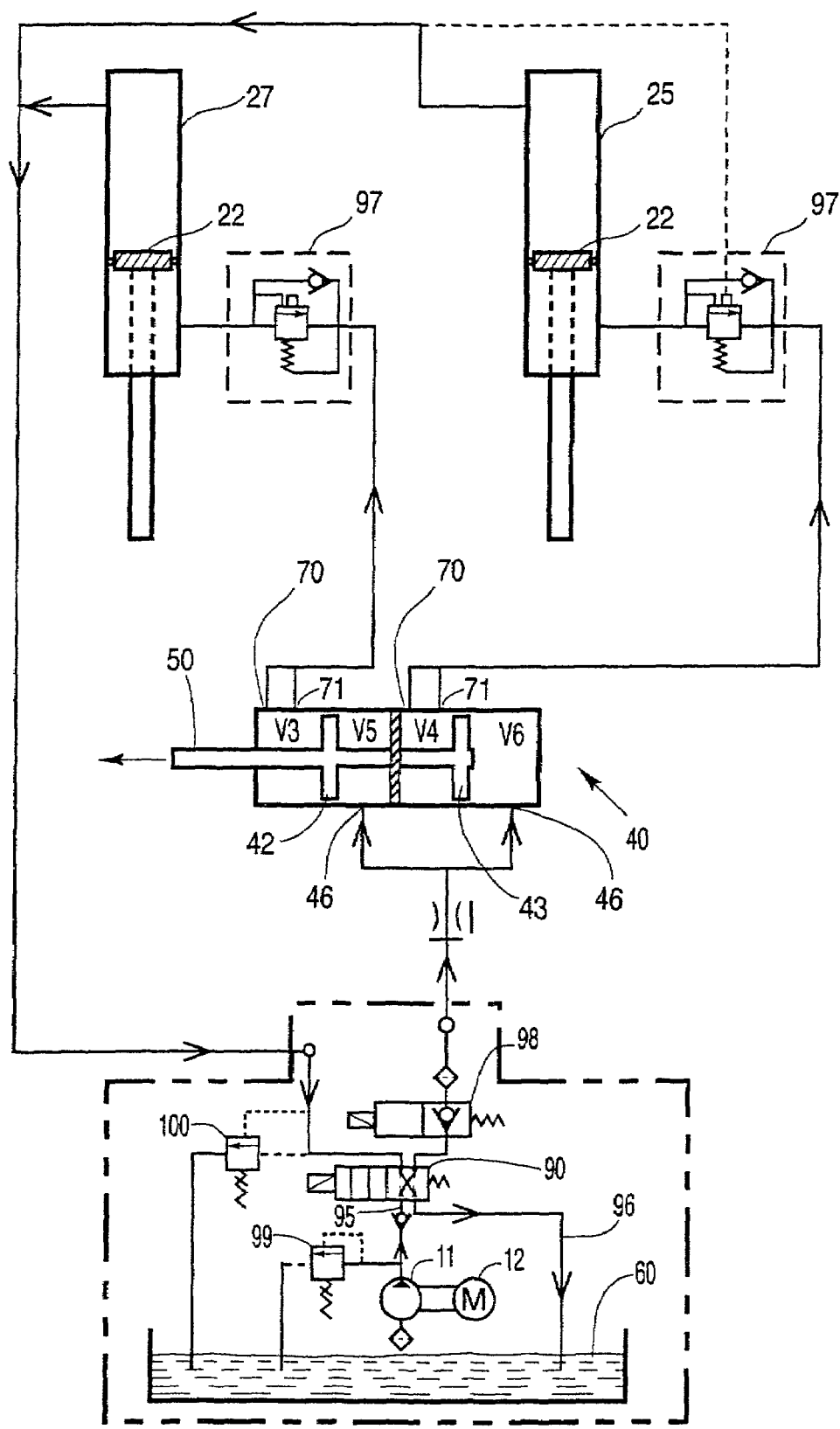
FIG. 5A is a view similar to FIG. 4A above, but for the embodiment of the invention wherein piston phasing means are provided on one end of the cylinder members of the positive displacement valve, for permitting re-phasing of piston members within the hydraulic cylinders when at the uppermost position of their travel (ie when the platform is at its uppermost (raised) position.
FIG. 5B is a view of the embodiment shown in FIG. 5A, showing re-phasing of the left hydraulic cylinder where the piston member in the left hydraulic cylinder is being permitted by the piston phasing means on the positive displacement valve to "catch up" to the piston member in the right hydraulic cylinder which has already reached the maximum extent of its travel.
Figure 5:
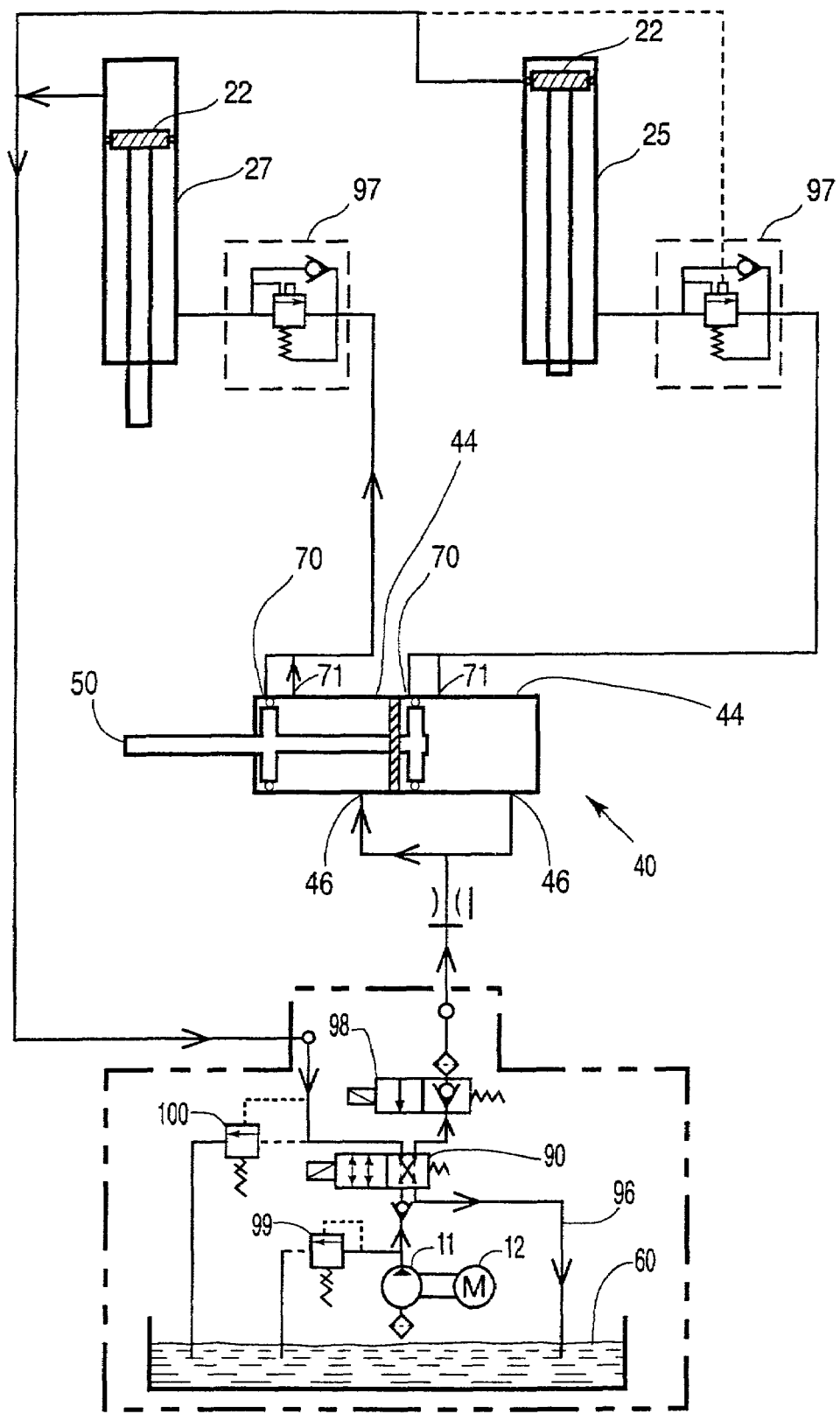

FIGS. 4A & 4B show a schematic of a hydraulic circuit for the hydraulic platform lift 10 of the present invention, having a positive displacement valve 40 wherein the shaft 50 extends from each side of pistons 42, 43 (see also FIGS. 8 & 10.). In an alternative embodiment of the positive displacement valve 40 of the present invention (see FIGS. 5A, 5B, and FIG. 6), the shaft 50 extends from both sides of one of the pistons (42) but from only one side of piston 43 (see FIG. 5A), the side of piston 43 that does not have the shaft 50 extending therefrom being the side of the piston 43 which receives hydraulic fluid from the pump 11 when the platform 21 is desired to be raised, as shown in FIG. 5A. Advantageously, due to the absence of the shaft 50 on side "V6" of piston 43, the surface area of the piston 43 against which the hydraulic fluid will be exerting pressure is greater than the surface area of the other side of piston 43, which does have a shaft 50 extending therefrom. Accordingly, a mechanical advantage can be obtained by this configuration, since for a pump 11 of given pressure, the greater surface area of one side of the piston 43 (the high pressure side) allows for a greater force to be exerted on the hydraulic fluid contained not only in volume "V4" but also in volume "V3" (see FIG. 5A) due to transmission of a portion of the greater force by shaft 50 from piston 43 to piston 42. Such greater force can then be transmitted through to hydraulic cylinders 25,27 to increase the lift capability of the cylinders 25,27.

In a preferred embodiment the positive displacement valve 40 possesses piston phasing means in the form of a pair of apertures 70,71 proximate one end of each of cylinder members 44, as best shown in FIGS. 6A, 8, and 10. In a preferred embodiment, one of the apertures (the aperture most proximate the cap end of positive disabled valve 40) is substantially larger in diameter than the other (See FIG. 6B). In the embodiment of the positive displacement valve 40 shown in FIG. 5A and FIG. 6A, the apertures 70,71 are at the leftmost extremity of each of cylinder members 44, and permit "phasing" (ie alignment) of piston members 22 in hydraulic cylinders 25,27 as they reach the top of their stroke within cylinders 25,27, as shown in FIG. 5B. In the embodiment of the positive displacement valve 40 shown in FIGS. 7 and 8, the pair of apertures 70,71 are situate proximate the rightmost extremity of each of cylinder members 44, and permit "phasing" (ie. alignment) of piston members 22 in hydraulic cylinders 25,27 as they reach the bottom of their stroke (ie when the platform 21 is close to reaching its lowermost position). In the embodiment of the positive displacement valve 40 shown in FIGS. 9 & 10, there are two pairs of apertures 70,71 and 72,73, which permit "phasing"(ie. equal positional alignment) when the piston members 22 in corresponding hydraulic cylinders reach the top and the bottom of their respective strokes.

In operation, the piston phasing means of the invention comprising pairs of apertures 70,71 and 72,73 operates as follows in achieving re-alignment of piston members 22. In particular, with reference to the positive displacement valve 40 and the hydraulic cylinders 25,27 shown in FIGS. 5B and 6 as an example, the pistons 42,43 in cylinder members 44 may in some circumstances (for example if the hydraulic cylinders 25,27 have poor seals) have moved to the extremity of travel(ie the far left of the positive displacement valve 40 shown in FIG. 5B) during the raising of the platform 21, yet one of the pistons 22 in hydraulic cylinder 27 had failed to reach the top of its travel. (See FIG. 5B). In such circumstances hydraulic fluid is still capable of flowing from aperture 71 (See FIG. 5B) to hydraulic cylinder 27 to allow it to "catch up" and thus become in phase with piston member 22 of hydraulic cylinder 25 which has already reached the extent of its upward travel.

Figure 9:
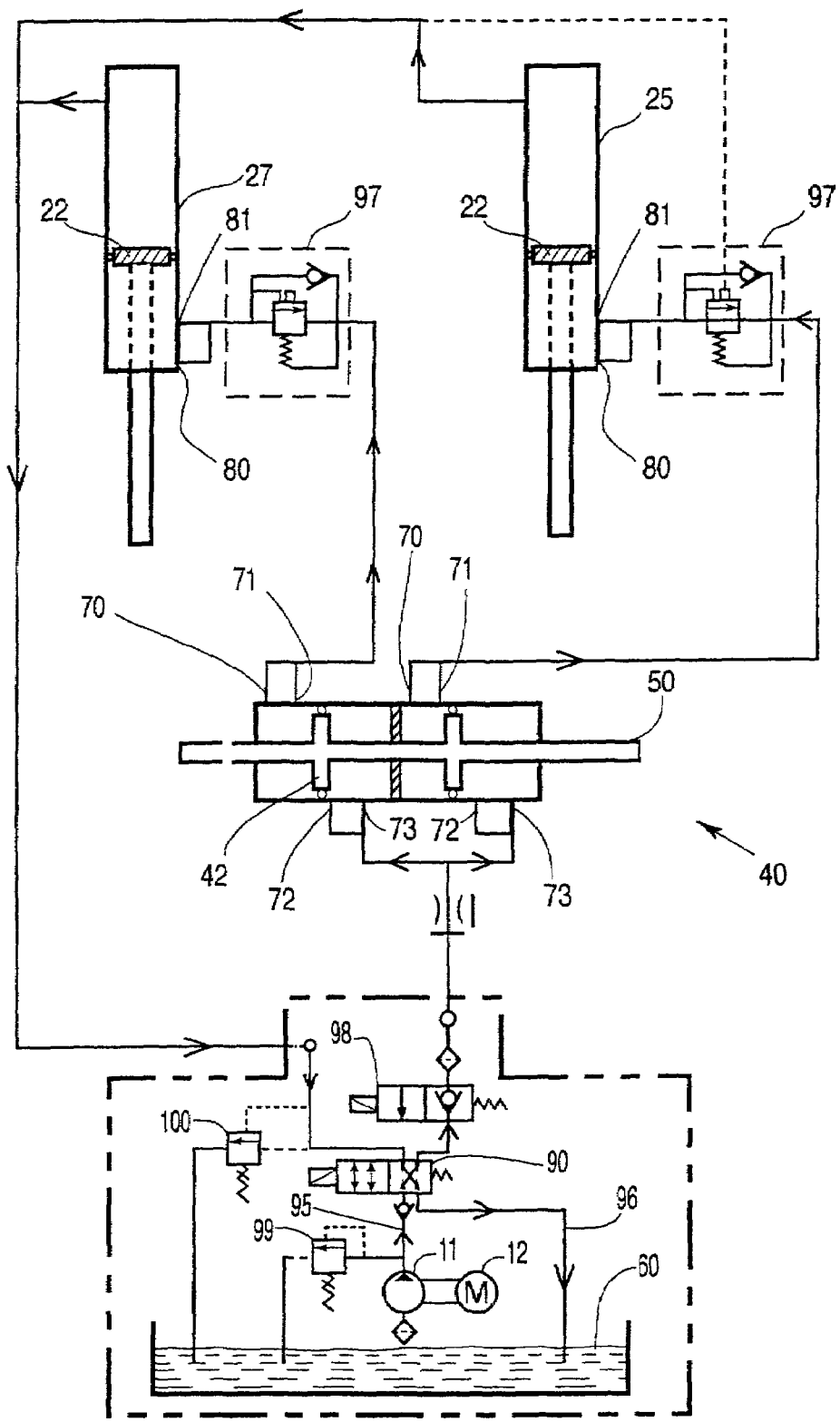
FIG. 9 is a view similar to FIGS. 4A, 5A and 7 above, but for the embodiment of the invention wherein piston phasing means are provided on both ends of each of the cylinder members of the positive displacement valve, for permitting re-phasing of piston members within the hydraulic cylinders when at both the uppermost and the lowermost position of their travel (ie when the platform is at its raised and lowered position)
Figure 11:
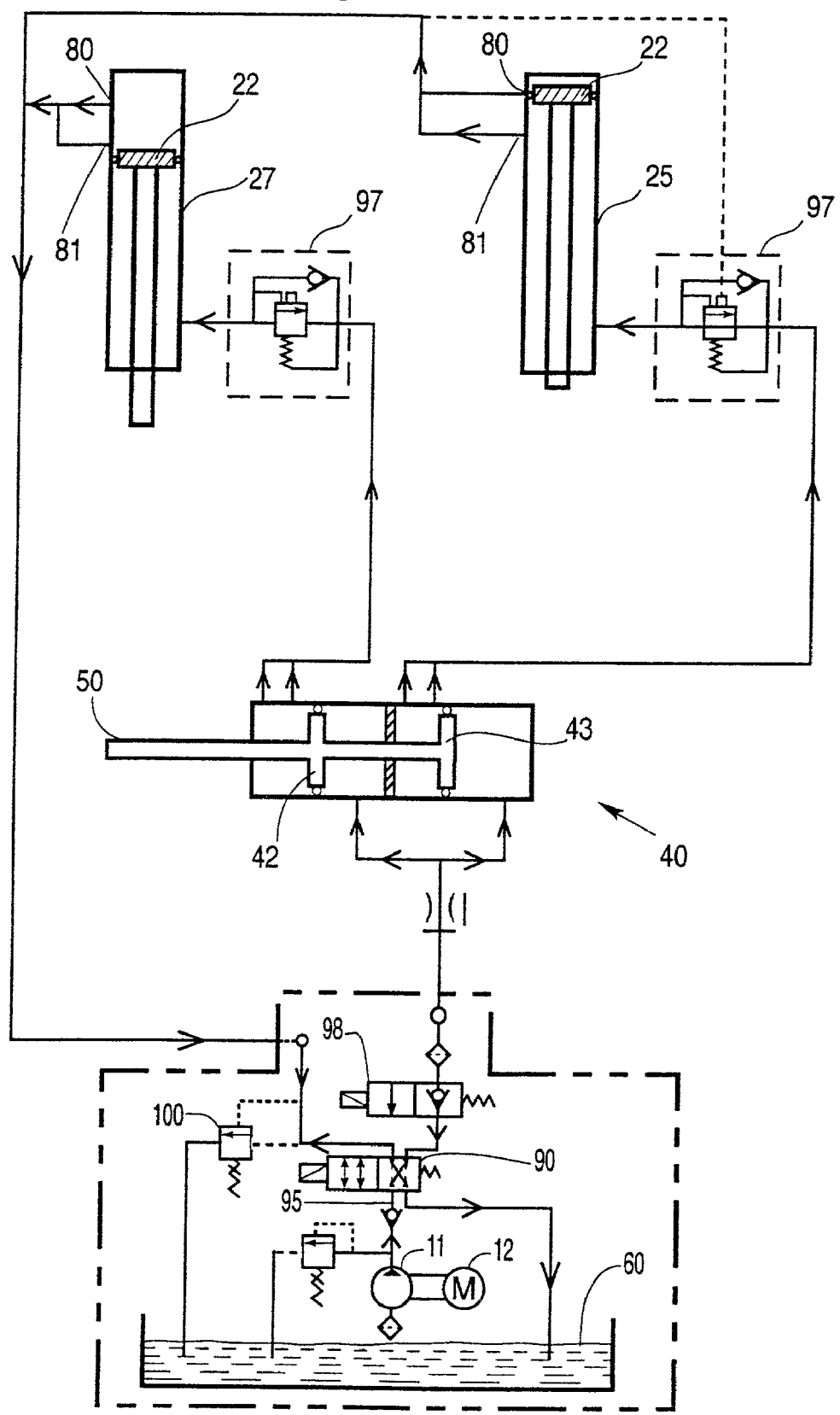
FIG. 11 is a further preferred embodiment of the invention, where the hydraulic cylinders each have phasing means for "phasing" each of the piston members therein, in the form of a pair of apertures proximate one end of each cylinder member, to permit phasing at the top, or bottom, or at both top and bottom of the travel of the piston member within the hydraulic cylinders (this embodiment shown permits only phasing at the top of travel).

In situations where there is piston member phasing means (ie apertures 80,81 on the hydraulic cylinders 25,27) such piston member phasing means operates in the following manner in order to bring the piston members 22 into realignment. In particular, FIG. 11 shows a situation where one of the piston members 22 in the right hydraulic cylinder 25 has reached the upper extremity of its travel, while the piston member 22 in the left hydraulic cylinder has become out of phase and has not reached its upper position. By use of aperture 81, hydraulic fluid can continue to flow out of the upper area above piston member 22 in right hydraulic cylinder 25 during raising of platform 21, thereby permitting piston 42,43 in positive displacement valve 40 to continue to inject hydraulic fluid into the rod end of hydraulic cylinders 25,27, thereby permitting the piston member 22 in left hydraulic cylinder 27 to continue to move upward until it is even with and aligned with the piston member 22 in right hydraulic cylinder 25, thereby rendering the platform 21 level. Alternatively, rather than have piston phasing means (ie apertures 80,81) situate at the top of left and right hydraulic cylinders 25,27 as shown in FIG. 11, such apertures may be situate proximate the bottom end of hydraulic cylinders 25,27, as shown in FIG. 9. In yet an alternative embodiment (not shown), apertures 80,81 may be situate at each end of hydraulic cylinders 25,27 to permit phasing of piston members 22 proximate the top or bottom of the stroke of such piston members 22 within hydraulic cylinder members 25,27. Such piston member phasing means may be employed with or without the piston phasing means in the positive displacement valve 40.

As may be seen generally from the various hydraulic circuits shown in FIGS. 4A,4B, 5A, 5B, 7, 9, and 11, other components may be included to best put into practice the invention. In particular, a solenoid operated flow reverser valve 90 may be introduced, which in the preferred embodiment is implemented in the hydraulic high pressure supply line 95 and the return line 96 intermediate the pump 11 and the positive displacement valve 40. This gives the hydraulic lift 10 the capability of either a power-up or a power-down capability. A solenoid-operated check valve 98 may also be introduced, to maintain the platform 21 in a fixed position when the pump 11 is not operating. Pressure relief valves 99 and 100 may be incorporated into the supply and return lines 95,96 respectively to protect against overpressure conditions caused by overload on the platform 21 or other overload conditions.

Last but not least, counterbalance valves 97 may be introduced in the hydraulic lift circuits as shown in FIGS.

4A,4B, 5A, 5B, 7, 9, and 11. The counterbalance valves 97 act as a flow restricter and prevent the platform 21 from coming down too fast (ie faster than the flow of hydraulic fluid from the pump 11 or from crashing down if a hydraulic line breaks. Alternatively, to accomplish a similar result, such counterbalance valves 97 may comprise a spool valve (solenoid operated), a pilot check valve, or a solenoid-operated poppet valve.

Figure 12:
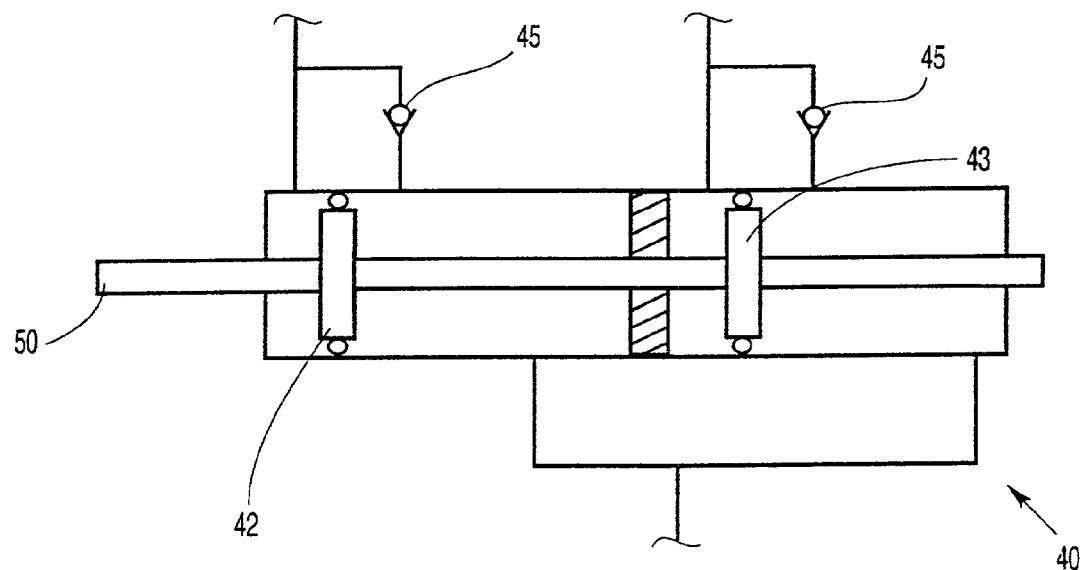
FIG. 12A is an enlarged view of the positive displacement valve of the embodiment shown in FIG. 11, in the embodiment where the phasing ports thereon utilize a manual check valve.
FIG. 12B is an enlarged view of the positive displacement valve of the embodiment where the phasing ports thereon utilize a solenoid-operated check valve.
Figure 12:
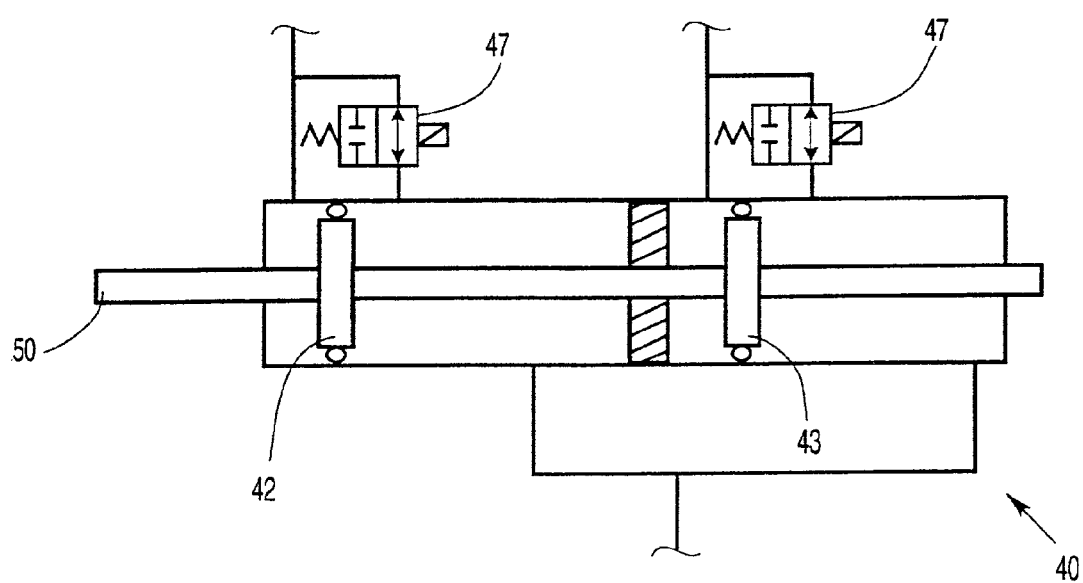

For phasing of the positive displacement valve 40, it is preferable that the hydraulic fluid line supplied to one of the phasing ports 70,71 (See FIGS. 12A, 12B) incorporate a manual check valve 45 or a solenoid operated check valve 47, as show in FIGS. 12A and 12B respectively.

Figure 13:
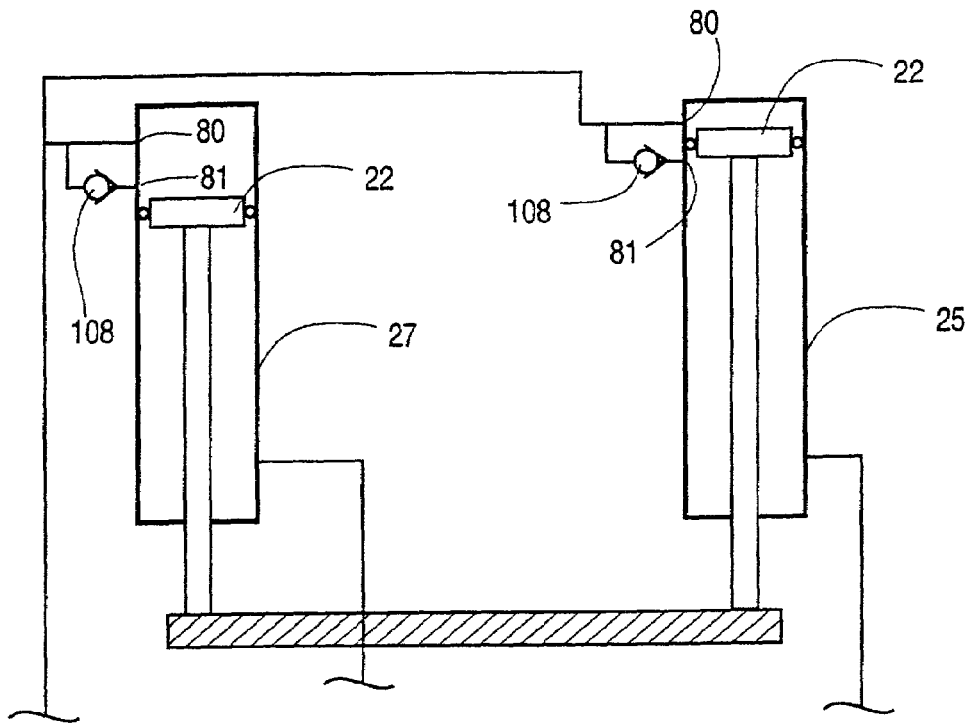
FIG. 13A is an enlarged view of the hydraulic cylinders shown in FIG. 11, in the embodiment where the phasing parts therein utilize a manual check valve.
FIG. 13B is an enlarged view of the hydraulic cylinder shown in FIG. 11, in the embodiment where the phasing ports utilize a solenoid-operated check valve.
Figure 13:
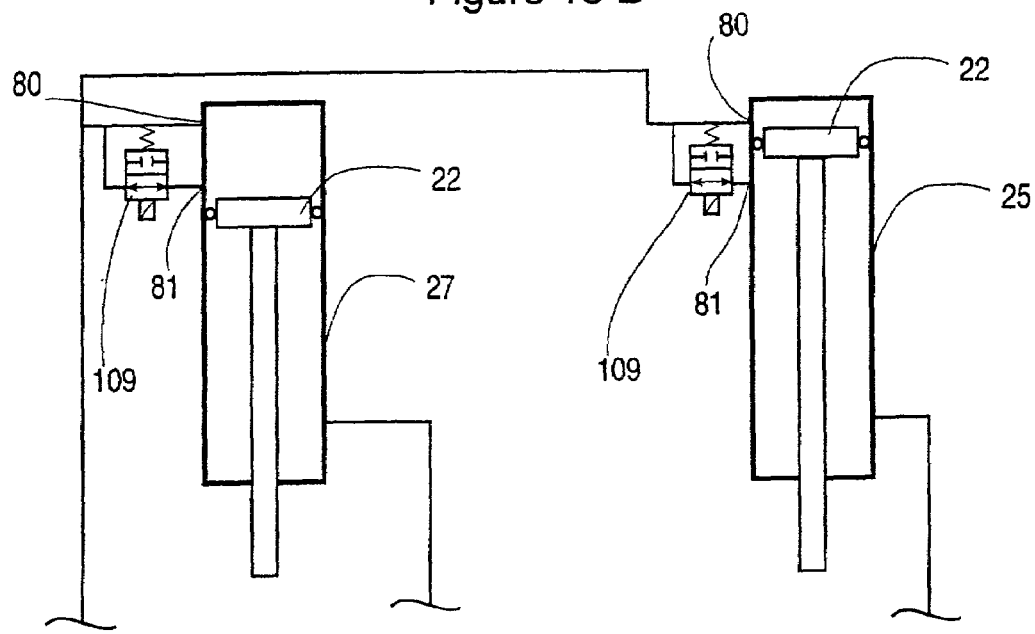

Similarly for phasing of the hydraulic cylinders 25,27, it is preferable that the hydraulic fluid line connected to apertures 81 (ie the lower aperture) incorporate either a manual check valve 108 or a solenoid operated check valve 109, as shown in FIGS. 13A, 13B). The check valves 45,47, 108 and 109 each function to prevent leakage of oil when the platform 21 is intended to remain at rest and no hydraulic fluid is being supplied by the pump 11.

Although the disclosure describes and illustrates preferred embodiments of the invention, it is understood that the invention is not limited to these particular embodiments. Many variations and modifications will now occur to those skilled in the art. For a full definition of the invention, reference is to be made to the appended claims.

What is claimed is:

1. A positive displacement valve for use in a hydraulic circuit, the positive displacement valve comprising:
   a pair of longitudinally-moveable, spaced-apart pistons, each operatively connected by longitudinal shaft means to each other so that movement of one piston causes an equal movement of the other, each situated within a corresponding cylinder member, the cylinder members arranged in juxtaposed relation to each other, each cylinder member having mutually opposed ends and an aperture proximate each of the opposed ends thereof so as to permit ingress and egress of a pressurized hydraulic fluid to and from said cylinder members, respectively; and
   piston phasing means integral with at least one of the cylinder members comprising at least one egress port situated in said at least one cylinder member proximate at least one opposed end of said at least one cylinder member, said egress port together with an associated aperture forming a pair of apertures proximate the at least one opposed end of said at least one cylinder member, said egress port operable to permit egress of at least some of the pressurized hydraulic fluid that is ingressing into the as least one cylinder member.

2. The positive displacement valve of claim 1, the cylinder members each having a longitudinal axis, said egress port and said associated aperture spaced apart from each other along the longitudinal axis thereof, but together situated proximate at least one end of the at least one of the cylinder members.

3. The positive displacement valve of claim 1 wherein the piston phasing means comprises an egress port in each of the cylinder members, each egress port situated proximate a respective aperture in said cylinder member and together with said respective aperture situated proximate at least one end of each of the cylinder members.

4. The positive displacement valve of claim 2 wherein the associated aperture is larger in cross-sectional area than the egress port.

5. The positive displacement valve of claim 2 further comprising a check valve in fluid communication with one of the pair of apertures for restricting reverse flow of hydraulic fluid.

6. The positive displacement valve of claim 4 wherein the associated aperture of the pair of apertures is the most proximate to the opposed end of the at least one of the cylinder members which the pair of apertures is situated proximate.

7. A hydraulic platform lift for use with a truck or truck trailer, the hydraulic platform lift comprising:
   a platform member having two opposite side edges;
   first and second hydraulic cylinders each having a piston member therein, each of said first and second hydraulic cylinders operatively coupled to a respective side edge of said platform member to permit raising and lowering of said platform member;
   pump means for supplying a pressurized hydraulic fluid to said hydraulic cylinders via a positive displacement means;
   said positive displacement means comprising a pair of longitudinally-moveable, spaced-apart pistons, each operatively connected by longitudinal shaft means to each other so that movement of one piston causes an equal movement of the other, each situated within a corresponding cylinder member, the cylinder members arranged in juxtaposed relation to each other, each cylinder member having mutually opposed ends and an aperture proximate each of the opposed ends thereof so as to permit ingress and egress of the pressurized hydraulic fluid from within said cylinder members to said respective first and second hydraulic cylinders; and
   piston phasing means integral with at least one of the cylinder members comprising at least one egress port situated in said at least one cylinder member proximate at least one opposed end of said at least one cylinder member, said egress port together with an associated aperture forming a pair of apertures proximate the at least one opposed end of said at least one cylinder member, said egress port operable to permit egress of at least some of the pressurized hydraulic fluid that is ingressing into the at least one cylinder member.

8. The hydraulic platform lift of claim 7 the cylinder members each having a longitudinal axis, said egress port and said associated aperture spaced apart from each other along the longitudinal axis thereof, but together situated proximate at least one end of the at least one of the cylinder members.

9. The hydraulic platform lift of claim 7 wherein the piston phasing means comprises an egress port in each of the cylinder members, each egress port situated proximate a respective aperture in said cylinder member and together with said respective aperture situated proximate at least one end of each of the cylinder members.

10. The hydraulic platform lift of claim 8 wherein the associated aperture is larger in cross-sectional area than the egress port.

11. The hydraulic platform lift of claim 8 further comprising a check valve in fluid communication with one of the pair of apertures for restricting reverse flow of hydraulic fluid.

12. The hydraulic platform lift of claim 10 wherein the associated aperture of the pair of apertures is the most proximate to the opposed end of the at least one of the hydraulic cylinders which the pair of apertures is situated proximate.

13. A hydraulic platform lift for use with a truck or truck trailer, the hydraulic platform lift comprising:
   a platform member having two opposite side edges;
   first and second hydraulic cylinders each having a piston member therein, each of said first and second hydraulic cylinders operatively coupled to a respective side edge of said platform member to permit raising and lowering of said platform member;
   pump means for supplying a pressurized hydraulic fluid to said hydraulic cylinders via a positive displacement means;
   said positive displacement means comprising a pair of longitudinally-moveable, spaced-apart pistons, each operatively connected by longitudinal shaft means to each other so that movement of one piston causes an equal movement of the other, each situated within a corresponding cylinder member, the cylinder members arranged in juxtaposed relation to each other, each cylinder member having mutually opposed ends and an aperture proximate each of the opposite ends thereof so as to permit ingress and egress of the pressurized hydraulic fluid to said respective first and second hydraulic cylinders; and
   piston phasing means integral with at least one of the hydraulic cylinders comprising at least one egress port situated in said at least one hydraulic cylinder proximate at least one opposed end of said at least one hydraulic cylinder, said egress port together with the associated aperture forming a pair of apertures proximate the at least one opposed end of said at least one hydraulic cylinder, said egress port operable to permit egress of at least some of the pressurized hydraulic fluid that is ingressing into the at least one hydraulic cylinder.

14. The hydraulic platform lift of claim 13, the hydraulic cylinders each having a longitudinal axis, said egress port and said associated aperture spaced apart from each other along the longitudinal axis thereof, but together situated proximate at least one end of the at least one of the hydraulic cylinders.

15. The hydraulic platform lift of claim 13 wherein the piston phasing means comprises an egress port in each of the hydraulic cylinders, each egress port situated proximate a respective aperture in said hydraulic cylinder and together with said respective aperture situated proximate at least one end of each of the hydraulic cylinders.

16. The hydraulic platform lift of claim 14 wherein the associated aperture is larger in cross-sectional area than the egress port.

17. The hydraulic platform lift of claim 14 further comprising a check valve in fluid communication with one of the pair of apertures for restricting reverse flow of hydraulic fluid.

18. The hydraulic platform lift of claim 16 wherein the associated aperture of the pair of apertures is the most proximate to the opposed end of the at least one of the hydraulic cylinders which the pair of apertures is situated proximate.

19. A hydraulic platform lift for use with a truck or truck trailer, the hydraulic platform lift comprising:
   a platform member having two opposite side edges;
   first and second hydraulic cylinders each having a piston member therein, each of said first and second hydraulic cylinders operatively coupled to a respective side edge of said platform member to permit raising and lowering of said platform member;
   pump means for supplying a pressurized hydraulic fluid to said hydraulic cylinders via a positive displacement means;
   said positive displacement means comprising a pair of longitudinal-moveable, spaced-apart pistons, each operatively connected by longitudinal shaft means to each other so that movement of one piston causes an equal movement of the other, each situated within a corresponding cylinder member, the cylinder members arranged in juxtaposed relation to each other, each cylinder member having mutually opposed ends and an aperture proximate each of the opposite ends thereof so as to permit ingress and egress of the pressurized hydraulic fluid to said respective first and second hydraulic cylinders;
   piston phasing means integral with at least one of the hydraulic cylinders comprising at least one egress port situated in said at least one hydraulic cylinder proximate at least one opposed end of said at least one hydraulic cylinder, said egress port together with the associated aperture forming a pair of apertures proximate the at least one opposed end of said at least one hydraulic cylinder, said egress port operable to permit egress of at least some of the pressurized hydraulic fluid that is ingressing into the at least one hydraulic cylinder; and
   piston phasing means integral with at least one of the cylinder members comprising at least one egress port situated in said at least one cylinder member proximate at least one opposed end of said at least one cylinder member, said egress port together with the associated aperture forming a pair of apertures proximate the at least one opposed end of said at least one cylinder member, said egress port operable to permit egress of at least some of the pressurized hydraulic fluid that is ingressing into the at least one cylinder member.

20. The hydraulic platform lift of claim 19, the hydraulic cylinders and cylinder members each having a longitudinal axis, said egress port and said associated aperture spaced apart from each other along the longitudinal axis of at least one of the hydraulic cylinders and at least one of the cylinder members, said egress port and said associated aperture situated together proximate at least one end of the at least one of each of the hydraulic cylinders and the at least one of the cylinder members.

21. The hydraulic platform lift of claim 19, the hydraulic cylinders and cylinder members each having a longitudinal axis, said egress port and said associated aperture spaced apart from each other along the longitudinal axis of at least one of the hydraulic cylinders and in each of the cylinder members, said egress port and said associated aperture situated together and proximate at least one end of the at least one of the hydraulic cylinders and proximate at least one end of each of the cylinder members.

22. The hydraulic platform lift of claim 19, the hydraulic cylinders and cylinder members each having a longitudinal axis, said egress port and said associated aperture spaced apart from each other along the longitudinal axis of each of the hydraulic cylinders and in at least one of the cylinder members, proximate at least one end of each of the hydraulic cylinders and proximate at least one end of the at least one of the cylinder members.

23. The hydraulic platform lift of claim 20 wherein the associated aperture is larger in cross-sectional area than the egress port.

24. The hydraulic platform lift of claim 20 further comprising a check valve in fluid communication with one of the pair of apertures for restricting reverse flow of hydraulic fluid.

25. The hydraulic platform lift of claim 24 wherein the associated aperture of the pair of apertures is the most proximate to the opposed end of the at least one of the hydraulic cylinders which the pair of apertures is situated proximate.

* * * * *